United States Patent [19]
Harris

[11] Patent Number: 5,940,054
[45] Date of Patent: Aug. 17, 1999

[54] TRIBOELECTRIC ELECTRET

[76] Inventor: Ellis D. Harris, 1646 Lynoak Dr., Claremont, Calif. 91711

[21] Appl. No.: 08/661,467

[22] Filed: Jun. 11, 1996

[51] Int. Cl.$^6$ ..................................................... E09G 3/34
[52] U.S. Cl. ........................... 345/85; 345/107; 359/295; 359/296
[58] Field of Search ..................... 345/85, 107; 359/295, 359/296

[56] References Cited

U.S. PATENT DOCUMENTS

| | | | |
|---|---|---|---|
| 4,891,635 | 1/1990 | Hata | 345/85 |
| 5,389,945 | 2/1995 | Sheridon | 345/107 |
| 5,751,268 | 5/1998 | Sheridon | 345/107 |
| 5,760,761 | 6/1998 | Sheridon | 345/107 |
| 5,777,782 | 7/1998 | Sheridon | 345/107 |

*Primary Examiner*—Mark R. Powell
*Assistant Examiner*—Vincent E. Kovalick

[57] ABSTRACT

A triboelectric electret comprises dissimilar dielectric materials wherein two or more extremities acquire electric opposite or similar and opposite charges by triboelectric means. The application of an external electric field might cause the resulting electret to assume one of a number of preferential rotational and/or reciprocational positions. When constrained within a mechanical housing, and when drive electrodes are included, the triboelectric electret becomes a motive element which might function as a component of an electrostatic motor or micro motor. When optical attributes are included, the triboelectric electret motive element might serve to modify the visual appearance presented to an external viewer under ambient illumination and an array of these might function as an electronic visual display under ambient illumination wherein neither self luminosity nor a dedicated light source is needed.

18 Claims, 4 Drawing Sheets

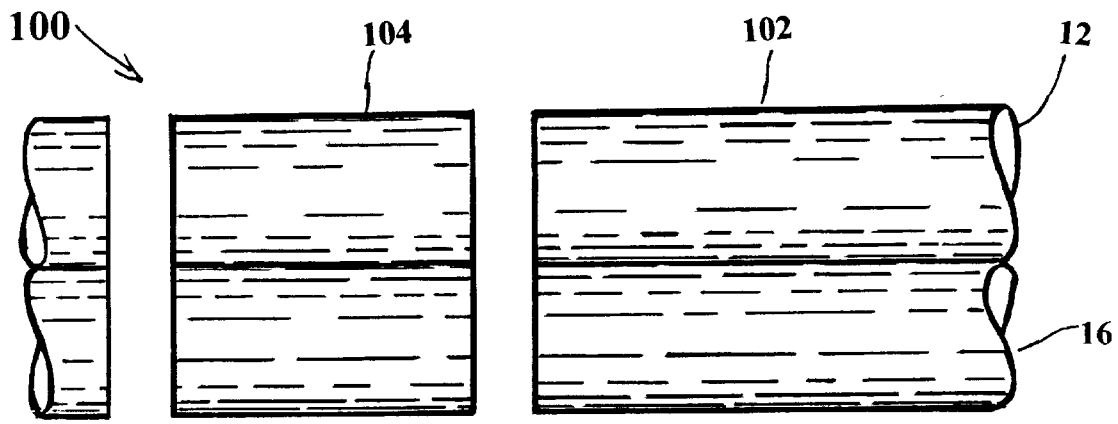
FIGURE 7
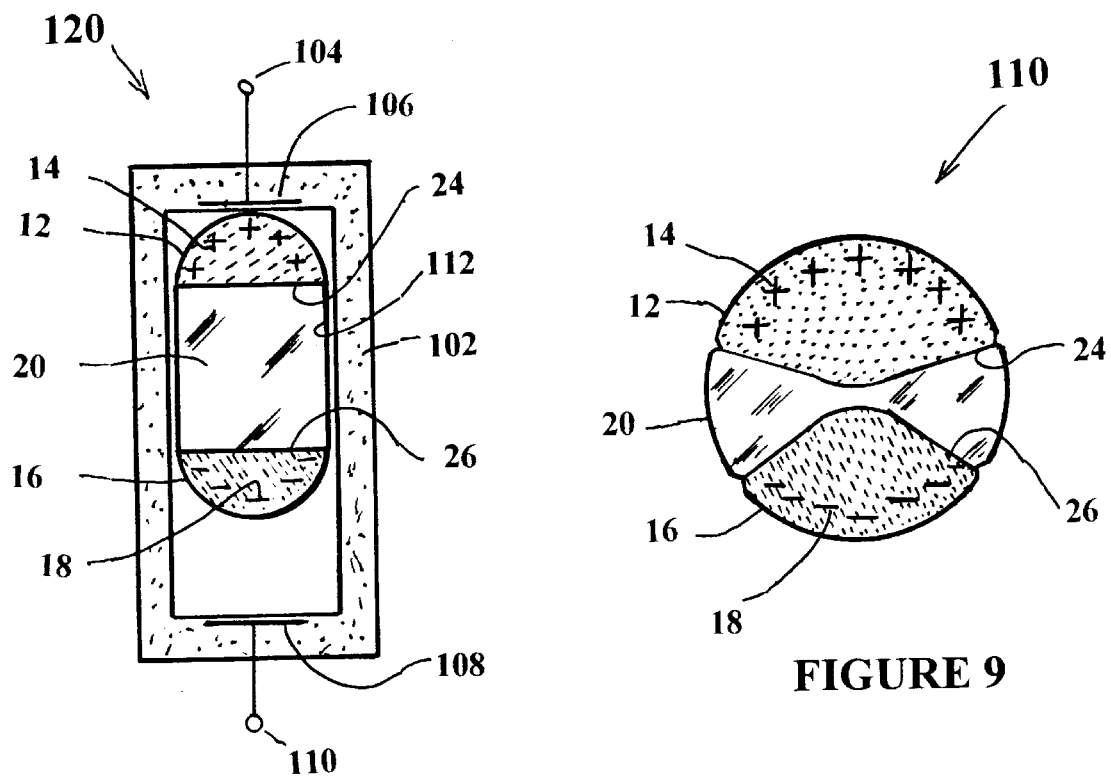
FIGURE 8
FIGURE 9

TRIBOELECTRIC ELECTRET

BACKGROUND OF THE INVENTION

This invention relates to an electret, and, more particularly, to an electret utilizing triboelectrically generated electrical charge.

An electret is the electric analog of a magnet wherein an electric dipole moment, or perhaps a multi pole moment, is more or less permanent and might be embedded within the material of the electret or might exist as surface charge. Historically, a wax such as Carnauba was,, is first melted and then allowed to cool under the influence of an electric field. Upon cooling molecular dipoles within the wax are frozen into an orientation determined by the field applied during cooling. The resulting bulk material is found to include a persistent internal electrical polarization and to exhibit the effect of long lasting charges of opposite polarity on it's surfaces. The historical name electret implies a dualism with a permanently charged magnet.

Electrets might also be created by ferroelectric effects wherein a ferroelectric material exhibits oppositely polarized charge on it's two surfaces as a result of applied pressure. Electrets might also be created in certain photoelectric insulating or semiconducting materials which might polarized internally under the combined influence of illuminating and a strong electric field.

It is well known that friction between dissimilar materials can result in electrification of the materials. Historically this effect has been the basis for a number of early electrostatic machines and electric shows. More recently, friction generated static electricity has been utilized to supply electric charge to toner particles in photo copying processes. The name given this process is triboelectric. During recent decades triboelectric processes have been explored extensively in conjunction with dry powder development in the photo copy industry. Toners are in common use which produce black or one of a number of colors. Toners are commonly available which posses special features, including magnetic and non visual features, including ultra violet or infrared features for producing magnetic or other specialty documents. By utilization of selected materials toners, including black and color, can be fabricated wherein either positive or negative charge is induced triboelectrically.

When two materials are brought into a frictional contact opposite charges might develop on the materials. The resulting polarities can be determined with an electrometer. By repeating this processes with a number of materials and arranging the materials in descending order from positive to negative a series of triboelectric activity can be defined. On such series [from G. S. Rose and S. G. Ward, Brit. J. Appl. Physics, 8, 121 (1957)] is as presented below:

| Positive: | Ethyl Cellulose |
| --- | --- |
| | Casein |
| | PMMA |
| | Ebonite |
| | Cellulose Acetate |
| | Glass |
| | All Metals |
| | Polystyrene |
| | Polyethylene |
| | Teflon |
| Negative: | Cellulose Nitrate |

Particles of these and/or similar materials, charged triboelectrically, form the basis for the toners used in a wide range of current photo copy products. Prior art technologies allow the creation of toner particles which might be triboelectrically charged to either polarity and these charged toner particles are available in a wide variety of colors. Toner colors of red, green, blue, cyan, magenta and yellow in particular are in common use in addition to black.

Toner particles might exist in clouds of individual charged particles wherein the particles are mutually repelled by their common charge. In the case of triboelectric electret particles, which might include equal and opposite charges on various extremities, the mutual repulsion dies not exist and such particles cannot by utilized in clouds. A convenient means of fabrication of triboelectric electret particles might be by means of fiber technology. For example, bundles of fibers of materials possessing different triboelectric properties might be first assembled and then cut into appropriate lengths, for instance by a focused laser beam. Following assembly of the said fiber bundles, they might be cut in place as part of an assembly procedure of the devices onto which they are to be included. Mechanical contact and/or friction might then be employed to produce an electric charges distribution on individual triboelectric electret particles.

Alternatively, a triboelectric electret might be cut from a single fiber which has been extruded from a plurality if material types.

Triboelectric surface charge densities might range between 7E-9 to 15E-8 Coulomb per $cm^2$ (Rose and Ward, op. cit.). In a representative case of a multiple fiber triboelectric electret formed from either a fiber bundle or extruded or drawn as a single multi material fiber an electric charge might cover a surface area of 42 microns by 85 microns, or some 3.5E-5 $cm^2$. At a surface charge density of 1E-8 Coulombs the charge on this area might comprise some 3.5E-13 Coulombs or 2.2E6 electronic charges. As a result of the discrete nature of electronic charge the actual charge might vary, having a one sigma variation of some 1,500 electronic charges. It might not be expected, apriori, that charges on the different extremities of a triboelectric electret would balance. A charge balance might be achieved or approximated, however, by control of the exposed areas of each of the triboelectrically active materials utilized.

Friction and/or repeated mechanical contact between materials exhibiting differing triboelectric activity is needed to establish and maintain the electric charge. An initial charge might be provided by acoustic means, whereby one of more triboelectric particles are agitated acoustically. Once charge is established the charge might be maintained by periodic agitation electronically. An external RF field might be utilized or electric signals might be supplied to electrodes which might be integral with an assembly.

Electret particles, which include separated charges of both polarities might find application in micro machines including visual displays. Micro machines commonly require a means of powered rotary or reciprocating motion. One form of prior art micro motors have employed vanes which have been fabricated by methods similar to the fabrication of VLSI integrated circuits and wherein the vanes are driven by commutated electrostatic fields. These prior art micro machine rotors often utilize materials common to integrated circuits, namely silicon along with various oxides and polymers. They have not been widely employed, mostly as a consequence of fabrication cost. The development and availability of cost effective micro machine motors will facilitate the development of micro machines for a number of potentially important applications, including specifically electronic display devices.

Prior art in the fabrication of fibers allow the production of fibers utilizing a wide range of materials, including glass, ceramics and many polymers. Utilization of these prior art fiber technologies for the fabrication of triboelectric electrets offers the potential of cost effective fabrication of electret particles. Fiber bundles composed of various fiber materials might first be assembled. These bundles might then be cut into particles which comprise small lengths of the bundles. Triboelectric electret rotors having two, four, or even more poles might by this approach be fabricated. The availability of a triboelectric electret rotor and/or translational positional element which might be positioned or driven by electric fields opens a wide range of possibilities and benefits in the emerging technologies of micro motors.

Prior art fabrication of multi glass optical fibers often starts with an optical preform which defines the final cross section of the resulting fiber. Using similar techniques a fiber might be fabricated starting with a preform which comprises a plurality parallel rods of glass of differing color, or other characteristics, which might have been fused into a single piece. Upon drawings into a fiber the resulting fiber will comprise a composite of the various glasses in a format defined by the preform. Capillaries, or hollow glass fibers, can be fabricated starting with a preform which includes a center which can be etched or otherwise removed following drawing into a fiber.

Triboelectricity is primarily a surface effect. If, following the drawings of a fiber, a polymer having triboelectric activity is laminated onto one or more of the exposed surfaces then the resulting fiber might exhibit triboelectric activity. A short length of this resulting fiber would then comprise a triboelectric electret element and might be either a solid fiber or a hollow capillary. By this means a triboelectric electret dipole or a multi-pole might be provided. A color gate might comprise a length of the said triboelectric electret element enclosed in an appropriate housing which might include drive electrodes. An array of these said color gates might comprise a color display device which might function under ambient illumination, thus eliminating the need, power requirement, and waste heat load of a self luminous display or of a dedicated external light source.

The propagation characteristics of a light beam can be changed by a number of basic means, including: complete or particle blockage, specular reflection as by a mirror, Lambertian reflection as by a diffuse reflecting surface, alteration of it's spectral makeup, or color, in a reflection or a transmission, alteration of the polarization properties, ray bending at a surface, and by diffraction by a grating. These means might be utilized singly or in combination to modify the characteristics of a light beam or of an incident illumination. The control of any one or some combination of these optical characteristics by electronic means offers the potential of enabling a display element which might function in ambient illumination, obviating the need for either self luminance or a dedicated light source for the display. The availability of motive power through the application of a triboelectric electret element provides the potential of the control of light by an optical gate which might employ any of combinations of the above discussed means. This capability in turn offers the possibility of arrays of light gates which might comprise a display for electronic data which might be free of the need for self luminosity and/of a dedicated light source, and which might work exclusively under ambient illumination.

In many important display applications, specifically those which are portable, the source of electrical power and the disposal of waste heat become dominate features in the design and cost. The availability of display elements which might work in ambient illumination thus offers considerable benefit in both function and cost.

It is an object of this invention to provide a triboelectric electret comprised of dissimilar materials wherein the dissimilar materials acquire opposite electric charges by triboelectric means.

It is a further object of this invention to provide a triboelectric electret dipole wherein the dipole might be oriented according to an external electric field.

It is yet another object of this invention to provide a triboelectric electret which comprises two or more electrostatic poles and which might assume any of a number of orientations under the control of external electric fields.

It is an additional object of this invention to provide an triboelectric electret element which might serve as the motive element in a motor or a micro motor.

It is another object of this invention to provide a triboelectric electret motive element which might be positioned rotationally and/or in reciprocation by external electric fields and wherein the optical and/or visual appearance of the element within it's local environment might be modified according to the motive element position when optical and/or visual attributes are included.

SUMMARY OF THE INVENTION

In accordance with the present invention a triboelectric electret comprises dissimilar dielectric materials wherein two or more extremities acquire electric opposite or similar and opposite charges by triboelectric means. The application of an external electric field might cause the resulting electret to assume one or a number of preferential rotational and/or reciprocational positions. When constrained within a mechanical housing, and when drive electrodes are included, the triboelectric electret might become a motive element which might function as a component of an electrostatic motor or micro motor. When optical attributes are included, the triboelectric electret motive element might serve to modify the visual appearance presented to an external viewer under ambient illumination and an array of these might function as an electronic visual display under ambient illumination wherein neither self luminosity nor a dedicated light source is needed.

Other objects and attainments together with a fuller understanding of the invention will become apparent and appreciated by referring to the following description and claims taken in conjunction with the accompanying drawings.

BRIEF DESCRIPTIONS OF THE DRAWINGS

FIG. 7 illustrates the fabrication of triboelectric electrets by means of fabrication of fiber bundles and then cutting the bundle into individual triboelectric electrets elements.

FIG. 8 illustrates a triboelectric electret fabricated to exploit reciprocating motion.

FIG. 9 illustrates a triboelectric electret fiber produced as an extrusion of multiple materials.

DESCRIPTION OF THE PREFERRED EMBODIMENT

Figure 1:
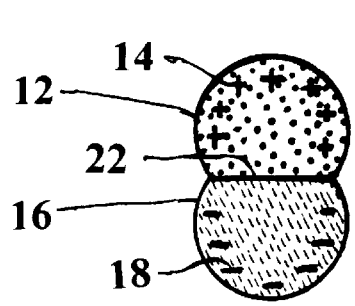
FIG. 1 is a schematic illustration of a cross section view of a pair of triboelectrically dissimilar materials joined wherein the assembly comprises a triboelectric electret.

Reference is now made to FIG. 1 wherein is illustrated a cross section view of a triboelectric electret 10 comprised of a pair of triboelectrically dissimilar dielectric materials 12 and 16, joined at a common surface 22. A first dielectric material 12 is chosen from among those dielectric material which posses positive triboelectrical activity, Ethyl Cellulose, for example. As a result of mechanical contact and/or friction with less positive triboelectric materials this first dielectric material 12 might acquire a positive charge 14. This first dielectric material 12 is joined at a surface 22 to a second dielectric material 16 having been selected for it's negative triboelectrical activity, Cellulose Nitrate, for example. As a result of mechanical contact and/or friction with less negative triboelectric materials this second dielectric material 16 might acquire a negative charge 18. When charged triboelectrically the assembly comprises an electrostatic dipole, or electret, which will tend to align with an external electric field.

Figure 2:
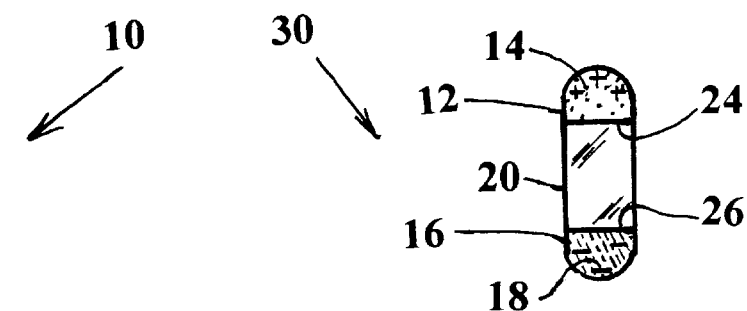
FIG. 2 is a schematic illustration of a cross section view of a pair of triboelectrically dissimilar materials separated by a third dielectric of intermediate triboelectric activity.

FIG. 2 illustrates another approach for a triboelectric electret dipole 30 wherein the said first triboelectric material 12, having positive triboelectric activity, is separated from the said second triboelectric material 16, having negative triboelectrical activity, by an intermediate dielectric material 20 which exhibits intermediate triboelectrical activity, Glass or Cellulose Acetate for example. The first triboelectric material 12 is joined to the intermediate dielectric material 20 at a first interface surface 24 and the second triboelectric material 16 is joined with the intermediate dielectric material 20 at a second interface surface 26. As a result of mechanical contact and/or friction the first triboelectric material 12 might develop a positive charge 14 and the second triboelectric material 16 might develop a negative charge 18. When thus charged triboelectrically, the assembly comprises a triboelectric electret dipole 30.

Figure 3:
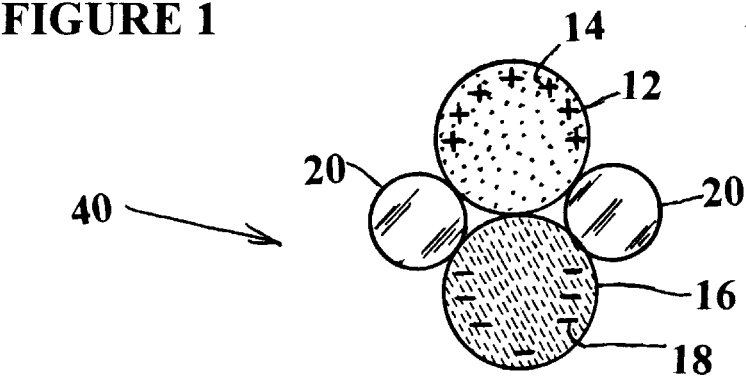
FIG. 3 is a schematic illustration of a cross section view of a triboelectric electret rotor assembly comprised of an assembly fibers of triboelectrically dissimilar materials.

In FIG. 3 is presented yet another approach for a triboelectric electret dipole 40 and which might be fabricated using fibers of various dielectric materials. When fibers are utilized in fabrication then the said first dielectric material 12 might be laid along side the said second dielectric material 16 and an additional pair of fibers 20, comprised of dielectric materials of intermediate triboelectric activity, laid along side of the triboelectrically active pair, 12 and 16, on each side. These said two fibers 20 of intermediate triboelectric activity might be of a smaller diameter than the said two triboelectrically active fibers, 12 and 18, wherein the resulting cross sectional of the four fiber assembly might fit inside a circular housing. Once fabricated the fiber assembly might be cut into appropriate lengths for utilization. As a result of mechanical contact and/or friction the first triboelectric material 12 might develop; a positive electric charge 14 and the second triboelectric material 16 might develop a negative electric charge 18. When thus charged triboelectrically, the assembly comprises a triboelectric electret dipole possessing rotational symmetry.

Figure 4:
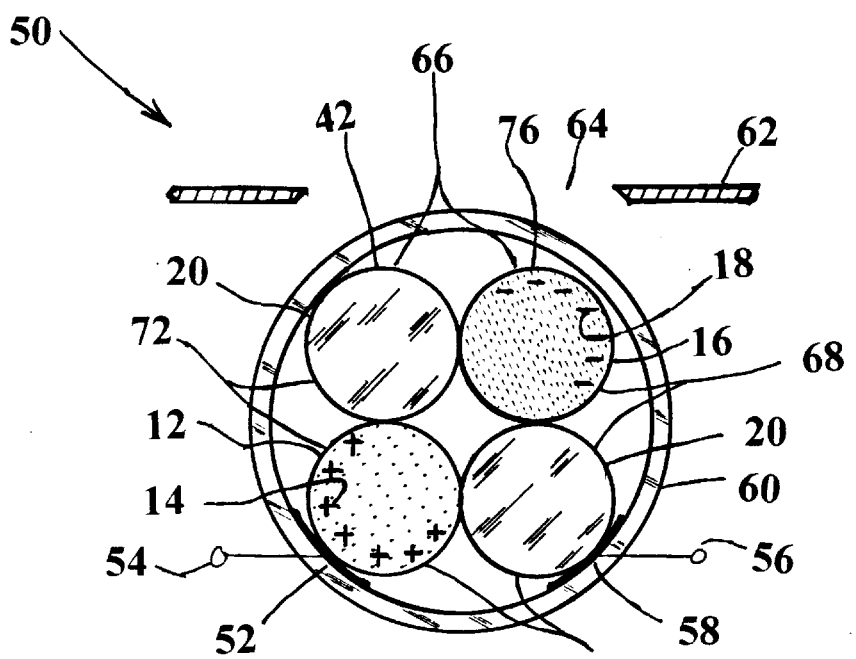
FIG. 4 is a schematic illustration of a cross section view of an another triboelectric electret rotor assembly comprising an assembly of fibers of triboelectrically dissimilar materials and including a motor housing and electric drive electrodes.

In FIG. 4 is illustrated schematically a cross sectional view of a rotationally symmetric triboelectric electret dipole assembly 50 comprised of a triboelectric electret element 76 within a housing 60 and which might include optical features 66, 68, 70 and 72 which enable the visual appearance of the assembly 50 to vary according to the rotational position of the triboelectric electret element 76 within the housing 60. The rotor in FIG. 4 comprises a first triboelectric material 12 which might develop a positive charge 14 triboelectrically and comprise a positive pole, a second triboelectric material 16 which might develop a negative charge 18 triboelectrically and comprise a negative pole, along with a pair of spacers 20 which are chosen from materials which have low triboelectric activity. The subassembly of these four materials comprise a triboelectric electret rotor 42. Included also in FIG. 4 is a mechanical housing 60, a first drive electrode 52, and a second drive electrode 58, together with electrical connectivity means whereby the first drive electrode 52 might be connected to an external drive signal, not shown, by a connection terminal 54 and whereby the second drive electrode 58 might be connected to an external drive signal, not shown, by a connection terminal 56. Also included in FIG. 4 is a baffle 62 whereby only a limited view 64 of the triboelectric electret rotor 42 is available to an external observer.

Under the influence of external electric drive signals the triboelectric electret rotor 42 might be positioned into one of four possible positions and any one of four possible colors be visible externally.

When the signal supplied to the first electrode 52 is negative and a null voltage is supplied to the second electrode 58 then this first electrode will attract the positive pole 12 of the electret rotor and the rotor 42 might be driven to a first position. In this first position a first visual characteristics 66 might be visible thorough the baffle 62. When this first view comprises a unique visual characteristic, such as a first color, then this first visual characteristic 66 might be visible to an external observer.

When the signal supplied to the second electrode 58 is negative and a null voltage is supplied to the first electrode 52 then the positive pole 12 of the electret rotor 42 will be attracted to this second electrode 58 and the rotor 42 might be driven to a second position which is at 90 degrees relative to the said first position. In this second position a second visual characteristic 68 might be visible thorough the baffle 62. When this second view comprises a second unique visual characteristic, such as a second color, then this second visual characteristic 68 might be visible to an external observer.

Likewise, when the signal supplied to the first electrode 52 is positive and a null voltage is supplied to the first electrode 58 then the negative pole 16 of the electret rotor 42 will be attracted to this first electrode 52 and the rotor 42 might be driven to a third position which is at 90 degrees relative to the said second position and at 180 degrees with respect to the said first position. In this third position a third visual characteristic 70 might be visible thorough the baffle 62. When this third view comprises a third unique visual characteristic, such as a third color, then this third visual characteristic 70 might be visible to an external observer.

When the signal supplied to the second electrode 58 is positive and a null voltage is supplied to the first electrode 52 then the negative pole 16 of the electret rotor 42 will be attracted to this second electrode 58 and the rotor 42 might be driven to a fourth position which is at 90 degrees relative to the said third position, at 180 degrees with respect to the said second position, and at 270 degrees relative to the said first position. In this fourth position a fourth unique visual characteristic 72 might be visible thorough the baffle 62. When this fourth view comprises a second unique visual characteristic, such as a fourth color, then this fourth visual characteristic 72 might be visible to an external observer.

By the means described above with reference to FIG. 4 the view presented to an external observer by the rotationally symmetric triboelectric electret dipole assembly 50 might be cycled between four unique colors or other visual characteristics as a result of four conditions of drive voltages supplied to the two electrodes 52 and 58.

Figure 5:
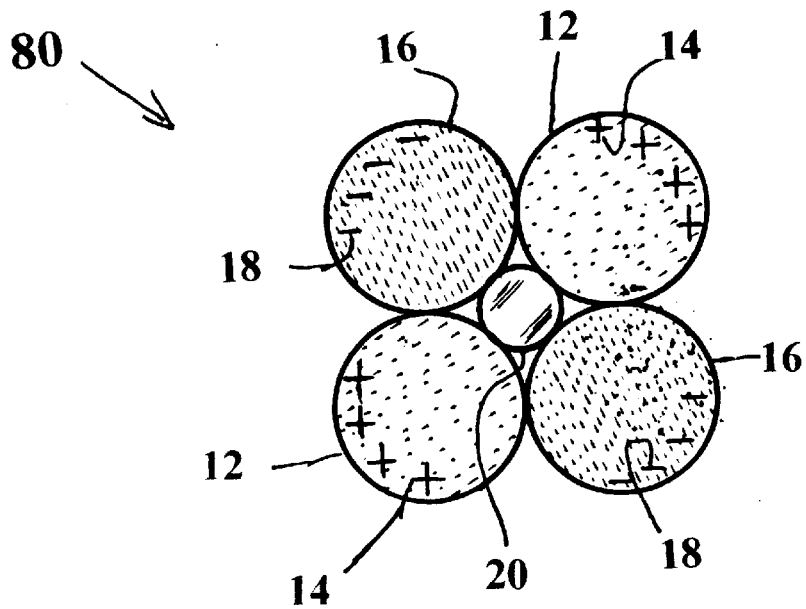
FIG. 5 is a schematic illustration of a quadripole triboelectric electret formed in accordance with the present invention.

FIG. 5 illustrates a schematic view in cross section of a quadripole triboelectric electret formed according to the present invention. A pair of materials 12 having positive triboelectrical activity, which might be fibers and which might be of identical material, are interspersed between a pair of materials 16 having negative triboelectric activity, which also might be fibers and which might be of a common material. A fourth material 20 having neutral triboelectric activity and, which might also be comprised of a fiber, might be included in the assembly. Under the influence of mechanical contact and/or friction the two positive materials 12 might acquire positive charge 14 and the two negative materials 16 might acquire negative charge 18. The four poles interspersed around the electret assembly 50 comprise, together quadripole triboelectric electret.

Figure 6:
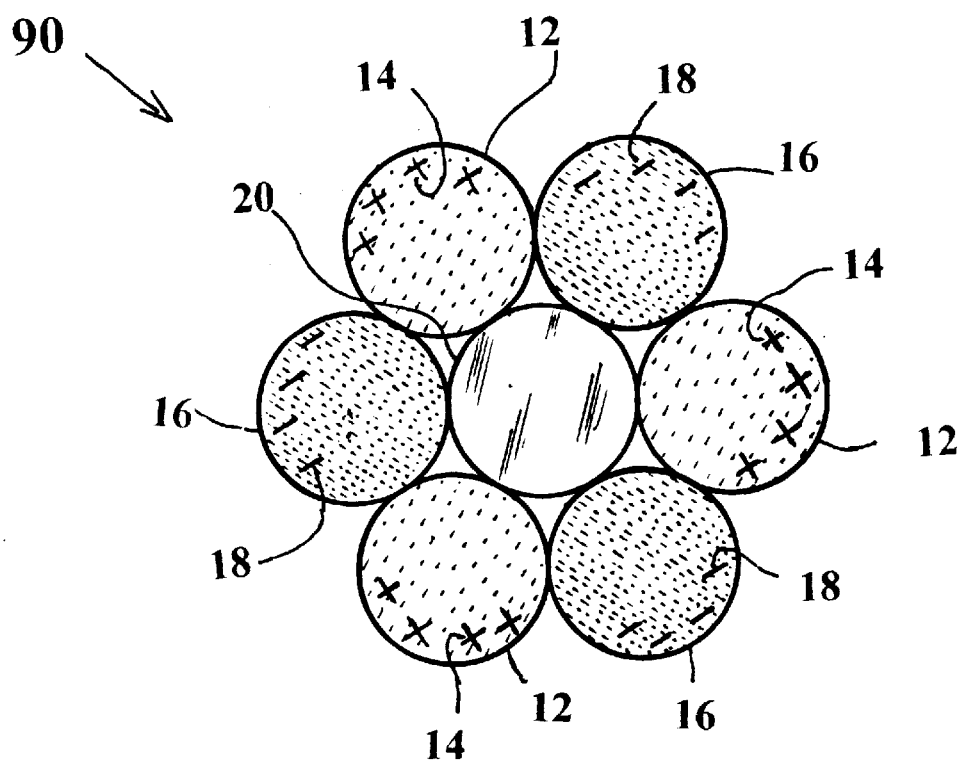
FIG. 6 is a schematic illustration of a six pole triboelectric electret formed in accordance with the present invention.

FIG. 6 further illustrates the multipole capability of triboelectric electret techniques according to the present invention. A six pole triboelectric electret 90 is comprised of three fibers of materials 12 having positive triboelectric activity which are interspersed between three fibers of materials 16 having negative triboelectric activity. An optical center fiber 20 having neutral triboelectric activity might be included as a possible structural feature. Under the influence of mechanical contact and/or friction three of these fibers 12 might acquire positive charge 14, and the other three fibers 16 might acquire negative charge 18 resulting in a six pole electret. By extrapolation higher order multipole electrets might be provided.

FIG. 7 illustrates fabrication of triboelectric electrets 100 by means of fiber technology. A bundle of fibers 102 is first fabricated composed of at least one material 12 having positive triboelectric activity and at least one material 16 possessing negative triboelectric activity. The bundle is then cut into convenient length 104, each of which might comprise a triboelectric electret formed according to the present invention.

FIG. 8 illustrates schematically a triboelectric electret assembly 120 formed according to the present invention which might be utilized for reciprocating motion. Illustrated in FIG. 8 is a rod 112 comprised of a first material 12 possessing positive triboelectric activity at the first end, and a second material 16 having negative triboelectric activity on the second end. The rod might include a center piece 20 composed of a material having neutral triboelectric activity. Under the influence of mechanical contact and/or friction the first material 12 on the first end of the rod 112 might acquire a positive charge 14 and the second material 16 at the second end of the rod 112 might acquire a negative charge 18. The rod would thus constitute a dipole electret element. Also illustrated in FIG. 8 is a closed tubular housing 102, conveniently longer than the rod 112. By means of the said housing 102 the dipole rod 112 is constrained to reciprocating motion. Illustrated also at the first end of the tubular housing is a first electrode 106 having connectivity means 104 for connection to an external drive voltage source, not shown. At the second end of the tubular housing 112 a second electrode 108 is illustrated having connectivity 110 to an external source of drive voltage, also not shown. By means of voltages supplied to the two electrodes 106 and 108 the rod 112 might be attracted to one or the other end of the tubular housing 102. By this means the rod might be driven to reciprocate between the two ends of the tubular housing.

FIG. 9 presents a schematic illustration of a cross section of a single triboelectric electret fiber which might have been extruded from multiple triboelectrically materials. A first triboelectric material 12, having positive triboelectric activity, is separated from a second triboelectric material 16, having negative triboelectrical activity, by an intermediate dielectric material 20 which exhibits intermediate triboelectrical activity, Glass or Cellulose Acetate for example. The first triboelectric material 12 is joined to the intermediate dielectric material 20 at a first interface surface 24 and the second triboelectric material 16 is joined with the intermediate dielectric material 20 at a second interface surface 26. As a result of mechanical contact and/or friction the first triboelectric material 12 might develop a positive charge 14 and the second triboelectric material 16 might develop a negative charge 18. When thus charged triboelectrically, the assembly comprises a triboelectric electret dipole 120.

Figure 10:
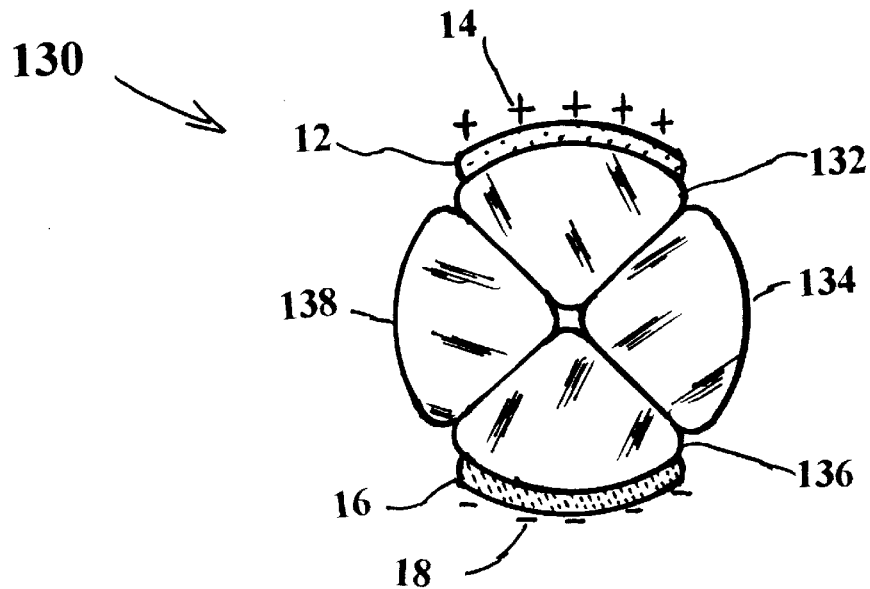
FIG. 10 illustrates a cross section of a multi colored glass fiber onto which triboelectrically active polymers have been laminated.

Reference is now made to FIG. 10 wherein is illustrated a cross section view of a triboelectric electret 130 comprised of a glass optical fiber composed of multicolored glasses, 132, 134, 136 and 138 onto which a pair of triboelectrically dissimilar dielectric materials, 12 and 16, have been laminated. A first dielectric material 12 is chosen from among those dielectric materials which posses positive triboelectrical activity, Ethyl Cellulose, for example and is laminated onto one of the colored glasses, 132. For example. As a result of mechanical contact and/or friction with less positive triboelectric materials this first dielectric material 12 might acquire a positive charge 14. A second dielectric material 16, selected for it's negative triboelectrical activity, Cellulose Nitrate, for example has been laminated onto the exposed surface of another of the colored glasses 136 for example, of which the optical fiber 130 is comprised. As a result of mechanical contact and/or friction with less negative triboelectric materials this second dielectric material 16 might acquire a negative charge 18. When charged triboelectrically the assembly comprises an electrostatic dipole, or electret, which will tend to align with an external electric field.

Figure 11:
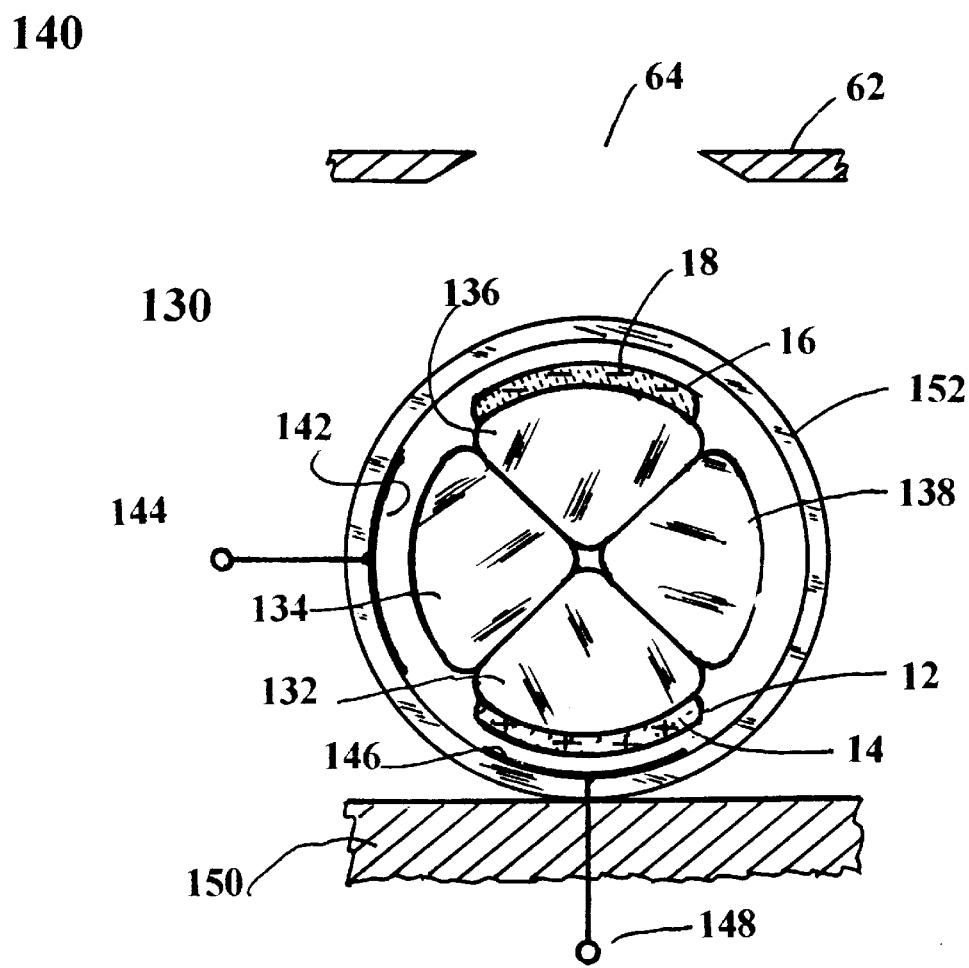
FIG. 11 illustrates a color optical gate which includes a multi colored glass fiber wherein triboelectrically active materials have been laminated onto various glass surfaces and wherein a housing with electrodes is included.

In FIG. 11 is illustrated schematically a cross sectional view of 140 of a triboelectric dipole 130 as described in FIG. 10 enclosed within a housing 152, including an electrode set 142 and 146. Also shown is a baffle 62 wherein the view presented to an external observer 64 might be restricted to a single color of the multicolored glass fiber. The electrodes might be separated by 90 degrees allowing the triboelectric rotor to be positioned into one of four positions spaced at 90 degrees. The application of a positive or a negative voltage to one or the other of the electrodes 142 or 146 by means of connection means 144 or 148 while a null voltage level is supplied to the other electrode might allow the triboelectric electret rotor to assume one of four selected positions wherein on of the four colors are exposed to vies by an external observer.

While the invention has been described in conjunction with specific embodiment, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A triboelectric electret comprising an assembly of dielectric materials wherein differing amounts and different polarities of electric charge might be induced upon various portions of the said assembly by triboelectric means, which might include mechanical contact and/or friction.

2. The triboelectric electret of claim 1 which might further comprise an assembly of fibers of dissimilar materials, which might have been cut to some convenient length and which additionally might possess rotational symmetry about the longitudinal axis.

3. The triboelectric electret element of claim 2 wherein combinations of the two possible electric charges might be induced on different locations by triboelectric or mechanical contact and/or friction and wherein the electret might form a dipole, a quadrapole or a multipole having an even or an odd number of electric poles.

4. The triboelectric electret assembly comprising triboelectric electret elements of claim 3 further comprising a housing within which the electret elements are contained and within which they are free to rotate and/or reciprocate, and which might further comprise drive electrodes whereby the electret element might be positioned rotationally and/or in reciprocation by applied electric voltages.

5. The triboelectric electret assembly of claim 4 wherein means are additionally provided to utilize the electret rotation and/or reciprocation as motive power.

6. The triboelectric electret assembly of claim 5 wherein optical features are included whereby the visual appearance individual elements of the assembly might be modified according to the rotational and/or reciprocational position of the individual electret elements and wherein the optical features modified by the rotational and/or reciprocational position of the electret element might include: Specular reflectivity, Lambertian reflectivity, optical polarization, color of the reflectivity, optical transmission intensity, optical transmission color, optical ray bending, optical ray blocking, optical diffraction, lens effects, and combinations of these.

7. The triboelectric electret assembly of claim 6 in an array comprising a plurality of triboelectric electret elements and further comprising electronic means and electrical connectivity means to provide a separate drive to each triboelectric electret element of the array and additionally comprising structural elements whereby the said array might serve as an electronic output display for externally supplied image and/or text data.

8. A triboelectric electret element comprising an extrusion of dielectric materials wherein differing amounts and polarity of electric charge might be induced upon various portions of the said extrusion by means of mechanical contact and/or friction and which might further comprise a dipole, a quadripole or a higher order multi pole and which might have been cut to some convenient length.

9. The triboelectric electret element of claim 8 further comprising mechanical housing and electrodes and means of connectivity whereby the said electret might be positioned within the said housing by the application of electrical signals.

10. The triboelectric electret element of claim 9 which might further comprise optical and/or visual features wherein the visual appearance of the said element in it's local background might be dependent upon the position of the said electret within the said housing.

11. The triboelectric electret element of claim 10 in an array comprising a plurality of the triboelectric electret elements of claim 10 wherein the array might serve as one component of an output display device whereby image and/or text data available from an external source might be displayed.

12. A triboelectric electret element comprising a glass fiber core, which might have been extruded from a preform composed of a plurality of glass materials wherein each of the glass materials might exhibit unique optical and/or visual characteristics, including color, and further comprising triboelectric coatings on selected portions of the glass fiber core wherein electric charge might be developed by triboelectric means.

13. The triboelectric electret element of claim 12 wherein the glass fiber core might be solid or might be a hollow capillary.

14. The triboelectric electret element comprising the triboelectric electret of claim 13 wherein combinations of the two possible electric charges might be induced on different locations by triboelectric or mechanical contact and/or friction and wherein the triboelectric electret might form a dipole, a quadrapole or a multipole having an even or an odd number of electric poles.

15. The triboelectric electret assembly comprising triboelectric electret element of claim 14 and further comprising a housing within which the electret element is contained and within which it is free to rotate and/or reciprocate, and wherein the said housing might include drive electrodes whereby the electret element might be positioned rotationally and/or in reciprocation by applied electric voltages.

16. The triboelectric electret assembly of claim 15 wherein means are additionally provided to utilize the electret rotation and/or reciprocation as motive power.

17. The triboelectric electret assembly of claim 15 wherein optical or visual features are included whereby the visual appearance of the assembly might be modified according to the rotational and/or reciprocational position of the electret element within the said housing and wherein the optical and/or visual features modified by the rotational and/or reciprocational position of the electret element might include: Specular reflectivity, Lambertian reflectivity, optical polarization, color of the reflectivity, optical transmission intensity, optical transmission color, optical ray bending, optical ray blocking, optical diffraction, lens effects, and combinations of these.

18. The triboelectric electret of claim 17 in array comprising a plurality of the triboelectric electret assemblies of claim 17 and further comprising electronic means and electrical connectivity means to provide a separate drive to each triboelectric electret element of the array and additionally comprising structural elements whereby the said array might serve as an electronic output display for externally supplied image and/or text data.

* * * * *